(12) United States Patent
Sagong et al.

(10) Patent No.: US 11,967,928 B2
(45) Date of Patent: Apr. 23, 2024

(54) HYBRID ENERGY GENERATION DEVICE USING SUNLIGHT AND SOLAR HEAT

(71) Applicant: KUKDONG ENERGY Corp, Gyeongsangbuk-do (KR)

(72) Inventors: Myeong Geon Sagong, Gyeongsangbuk-do (KR); Tae Yang Kim, Gyeongsangbuk-do (KR)

(73) Assignee: KUKDONG ENERGY Corp, Gyeongsangbuk-do (KR)

( * ) Notice: Subject to any disclaimer, the term of this patent is extended or adjusted under 35 U.S.C. 154(b) by 0 days.

(21) Appl. No.: 17/849,751

(22) Filed: Jun. 27, 2022

(65) Prior Publication Data
US 2023/0103622 A1    Apr. 6, 2023

(30) Foreign Application Priority Data
Oct. 5, 2021   (KR) .......................... 10-2021-0131754

(51) Int. Cl.
*H02S 40/44*   (2014.01)
*H02S 40/42*   (2014.01)

(52) U.S. Cl.
CPC .............. *H02S 40/44* (2014.12); *H02S 40/42* (2014.12)

(58) Field of Classification Search
CPC ... H02S 40/42; H02S 40/425; H01L 31/0521; H01L 31/052; H01L 31/0525
See application file for complete search history.

(56) References Cited

U.S. PATENT DOCUMENTS

| | | | | |
|---|---|---|---|---|
| 4,292,958 A | * | 10/1981 | Lee .......................... | F24S 80/30 126/906 |
| 4,368,726 A | * | 1/1983 | Ellsworth ............... | F24S 80/60 126/667 |
| 5,318,111 A | * | 6/1994 | Young ................. | F28D 1/05383 165/150 |

(Continued)

FOREIGN PATENT DOCUMENTS

| | | | |
|---|---|---|---|
| CN | 107084540 A | * | 8/2017 |
| CN | 111238056 A | * | 6/2020 |

(Continued)

OTHER PUBLICATIONS

KR-2017091296-A English machine translation (Year: 2017).*

(Continued)

*Primary Examiner* — Andrew J Golden
(74) *Attorney, Agent, or Firm* — Revolution IP, PLLC

(57) ABSTRACT

Proposed is a hybrid energy generation device using sunlight and solar heat including a photovoltaic panel in which a plurality of photovoltaic cells are arranged on a front side thereof, a first heat storage pipe having an inlet through which heat transfer fluid is introduced, and having a first slit hole formed on a side thereof in a longitudinal direction, a second heat storage pipe disposed to face the first heat storage pipe, having an outlet through which the heat transfer fluid is discharged, and having a second slit hole formed on a side thereof in a longitudinal direction, two or more third heat storage pipes arranged to connect the first heat storage pipe and the second heat storage pipe, and each having a third slit hole formed on a side thereof in a longitudinal direction, and a heat dissipation panel laminated on a back side of the PV panel.

4 Claims, 4 Drawing Sheets

(56) References Cited

U.S. PATENT DOCUMENTS

| | | | | |
|---|---|---|---|---|
| 7,931,073 B2* | 4/2011 | Gorbounov | ......... | F28D 1/05391 |
| | | | | 165/174 |
| 2015/0380585 A1* | 12/2015 | Sethi | ..................... | H01L 31/055 |
| | | | | 136/259 |

FOREIGN PATENT DOCUMENTS

| DE | 102008029676 A1 | * | 12/2009 | ................. F24J 2/10 |
| --- | --- | --- | --- | --- |
| DE | 102009038400 A1 | * | 3/2011 | ............... F24J 2/242 |
| GB | 2099133 A | * | 12/1982 | ............... F24J 2/242 |
| KR | 2017091296 A | * | 8/2017 | ................. F24J 2/04 |
| KR | 10-2019-0098636 A | | 8/2019 | |
| KR | 10-2020-0096012 A | | 8/2020 | |
| KR | 10-2021-0024958 A | | 3/2021 | |
| KR | 10-2296260 B1 | | 9/2021 | |

OTHER PUBLICATIONS

CN-111238056-A English machine translation (Year: 2020).*
DE-102008029676-A1 English machine translation (Year: 2009).*
DE-102009038400-A1 English machine translation (Year: 2011).*
CN-107084540-A English machine translation (Year: 2017).*

* cited by examiner

HYBRID ENERGY GENERATION DEVICE USING SUNLIGHT AND SOLAR HEAT

CROSS REFERENCE TO RELATED APPLICATION

The present application claims priority to Korean Patent Application No. 10-2021-0131754, filed Oct. 5, 2021, the entire contents of which is incorporated herein for all purposes by this reference.

BACKGROUND OF THE INVENTION

Field of the Invention

The present disclosure relates to a hybrid energy generation device using sunlight and solar heat.

Description of the Related Art

The continuation of the current economic system that relies on fossil energy (fossil fuels) is aggravating not only the problem of fossil fuel depletion but also environmental problems. In order to deal with these challenges, efforts are being made worldwide to solve the problems caused by the use of fossil fuels. Recently, various agreements that even developing countries can participate in such as carbon credits have been drawn up under the Intergovernmental Panel on Climate Change (IPCC). In the long term, the development of new and renewable energy and eco-friendly energy is expected to increase, and in the medium to long term, the paradigm of energy use is expected to change.

Since Korea is highly dependent on fossil fuels and its energy import dependency is very high, there are many factors that will cause the energy cost to rise sharply due to the depletion of fossil fuels. In addition, considering the BLUE Roadmap policy promoted by the Organization for Economic Co-operation and Development (OECD) and the International Energy Agency (IEA), it is predicted that the development and demand for new and renewable energy and eco-friendly energy will increase. Under these circumstances, the development of alternative energy resources for existing energy resources continues to grow in importance in terms of securing future energy sources and protecting the environment, and newly developed energy sources continue to grow in importance in terms of developing and utilizing environmentally friendly energy resources. Among alternative energy solutions researched and developed so far, the most efficient and advanced is the solar energy.

In general, power generation using solar energy includes solar power generation that converts sunlight or solar heat into electrical energy, and solar thermal collection power generation that collects solar heat from a solar source and uses the collected thermal energy for heating or warming water. As such, various types of photovoltaic (PV) modules or solar PV modules have been developed and used with a structure that generates energy necessary for life from solar energy.

However, when a PV module generates heat in the process of generating electricity, the temperature of the PV module increases, so there is a disadvantage that the electricity production efficiency may not rise above a certain level. That is, in the case of crystalline solar modules, only about 12 to 16% of the energy incident from the sun is used for power generation, which makes the efficiency of using solar energy quite low. In addition, as the rest of the energy is consumed as heat, the temperature of a PV cell is raised, which affects the cell's performance and durability, and due to the characteristics of the cell, there is a problem that the electric conversion efficiency decreases when converting solar energy to electric energy because of the temperature rise of the cell.

Accordingly, in the case of the PV module, a configuration for cooling by exchanging heat is installed on the back thereof to discharge waste heat, and the whole photovoltaic system is configured to improve the electricity generation performance by lowering the temperature of the PV module.

Against this backdrop, in order to utilize sunlight and solar heat at the same time, a photovoltaic-thermal (PVT) module that may be used for hot water supply or heating by efficiently using the heat generated in the electricity production process of the PV module has been developed and used.

Meanwhile, complex devices that can generate electricity using sunlight and can heat water using solar heat at the same time are also being developed. For example, Korean Patent Application Publication No. 2020-0096012 discloses "SOLAR HEAT AND SUNLIGHT HYBRID APPARATUS". The above-described apparatus, however, has problems in that it has a complicated structure, and thus ease of assembly is deteriorated, and that maintenance is difficult since the structure of the apparatus makes it difficult to replace a solar heat collector and a sunlight collector individually.

DOCUMENTS OF RELATED ART

Patent Documents (Patent Document 0001) Korean Patent Application Publication No. 10-2020-0096012 (Aug. 11, 2020)

SUMMARY OF THE INVENTION

Accordingly, the present disclosure has been made keeping in mind the above problems occurring in the related art, and the present disclosure is intended to provide a hybrid energy generation device using sunlight and solar heat, which enables maximizing the efficiency of cooling of photovoltaic (PV) panels and at the same time, maximizing the efficiency of heating water using solar heat.

In order to achieve the above objective, according to an embodiment of the present disclosure, there is provided a hybrid energy generation device using sunlight and solar heat, the device including: a photovoltaic (PV) panel in which a plurality of PV cells are arranged on a front side thereof; a first heat storage pipe having an inlet through which heat transfer fluid is introduced into the first heat storage pipe, and having a first slit hole formed on a side thereof in a longitudinal direction; a second heat storage pipe disposed to face the first heat storage pipe, the second heat storage pipe having an outlet through which the heat transfer fluid is discharged from the second heat storage pipe, and having a second slit hole formed on a side thereof in a longitudinal direction; at least two or more third heat storage pipes arranged to connect the first heat storage pipe and the second heat storage pipe to each other, and each having a third slit hole formed on a side thereof in a longitudinal direction; and a heat dissipation panel laminated on a back side of the PV panel, wherein a portion of a lower side and a portion of an upper side of the heat dissipation panel may be inserted into the first heat storage pipe and the second heat storage pipe while sealing and penetrating the first slit hole and the second slit hole, respectively, and the heat dissipation panel may also be inserted into the third heat storage pipe while sealing and penetrating the third slit hole.

In addition, the hybrid energy generation device may further include: at least two or more fourth heat storage pipes arranged to connect the at least two or more third heat storage pipes to each other.

Moreover, a fourth slit hole may be formed on a side of the fourth heat storage pipe in a longitudinal direction, and the heat dissipation panel may be inserted into the fourth heat storage pipe while sealing and penetrating the fourth slit hole.

In addition, each of an upper end surface and a lower end surface of the heat dissipation panel may be formed in a curved shape so as to be in close contact with an inner surface of the first heat storage pipe or the second heat storage pipe.

Furthermore, a lagging material may be provided on an exposed surface where the heat dissipation panel is not inserted.

As described above, according to the hybrid energy generation device using sunlight and solar heat of the present disclosure, a heat dissipation panel is in contact with a photovoltaic (PV) panel to directly exchange heat, maximizing the cooling efficiency of the PV panel, and at the same time, the heat dissipation panel is directly inserted into a plurality of heat storage pipes to directly exchange heat with a heat transfer fluid, enabling efficient hot water production by solar heat.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
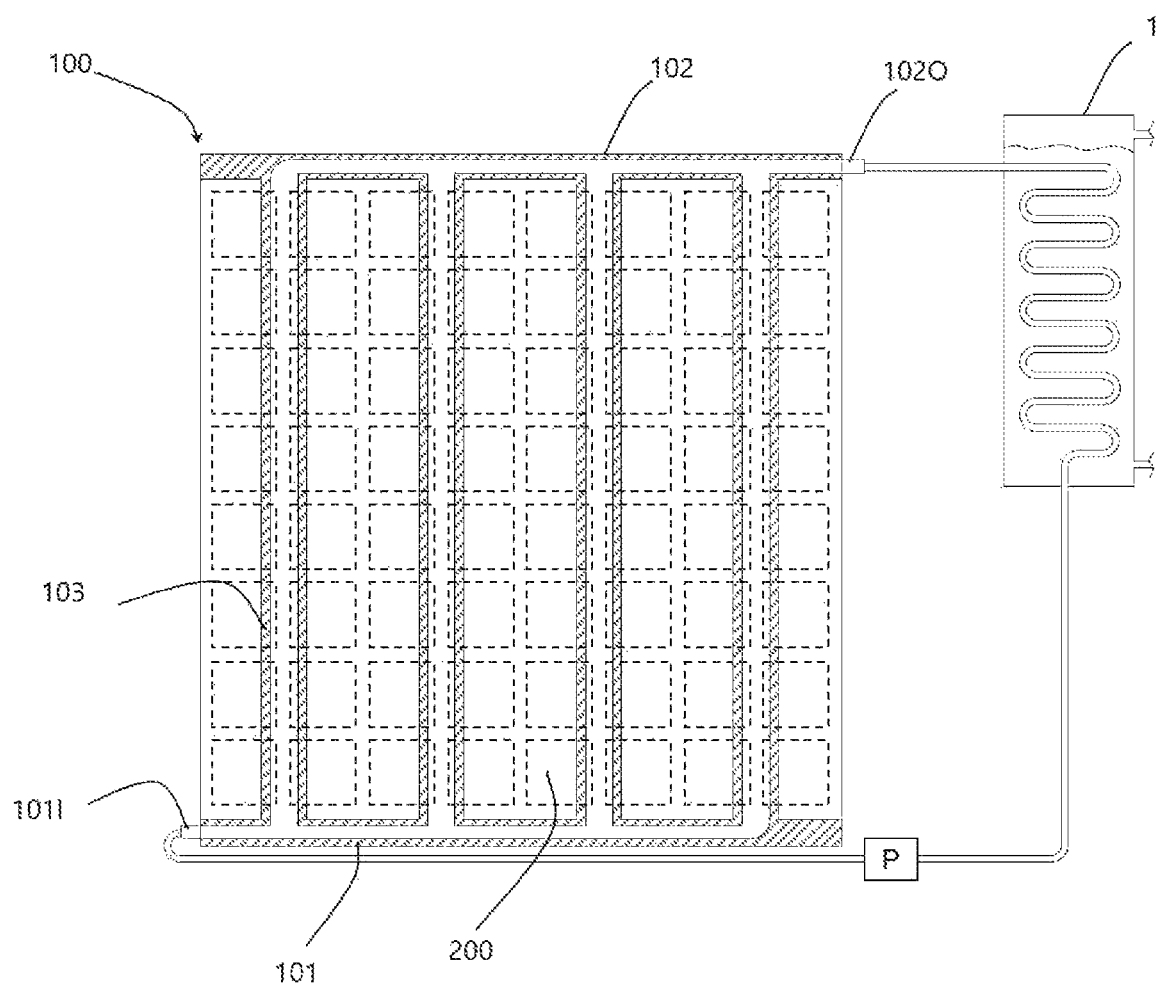
FIG. 1 is a view showing a hybrid energy generation device using sunlight and solar heat according to an embodiment of the present disclosure, and a schematic diagram of a hot water system.

Like reference numerals in the drawings refer to the same or similar functions throughout the various aspects.

Hereinafter, detailed contents for carrying out the present disclosure will be described on the basis of embodiments with reference to the accompanying drawings, and the embodiments will be described in sufficient detail to enable those skilled in the art to practice the present disclosure.

It should be understood that the various embodiments of the present disclosure are different but need not be mutually exclusive. For example, certain shapes, structures, and characteristics described herein with respect to one embodiment may be implemented in other embodiments without departing from the spirit and scope of the present disclosure.

Therefore, the detailed description given below is not intended to be taken in a limited sense, and the scope of the present disclosure is defined only by the appended claims, along with any scope equivalent to that claimed by the claims, if properly set forth.

A whole system including a hybrid energy generation device using sunlight and solar heat 100 (hereinafter referred to as a hybrid energy generation device) according to an embodiment of the present disclosure consists of a heating pipe included in a heat storage tank 1, a transfer pipe, and the hybrid energy generation device 100.

The heat storage tank 1 is a water tank formed to have a predetermined space, and has a supply port for receiving water for domestic use connected to the upper part, and a discharge port for discharging heated water connected to the lower part. The heating pipe is provided inside the heat storage tank to increase the temperature of the water in the tank through heat exchange with the water.

The transfer pipe is connected to an inlet 1011 and an outlet 1020 of the hybrid energy generating device 100 to constitute a predetermined circulation system through which heat transfer fluid may flow. The heat transfer fluid cooled through heat exchange in the heat storage tank 1 flows into the hybrid energy generating device 100 and raises its temperature through heat exchange with the hybrid energy generating device 100, and then the temperature-raised heat transfer fluid flows back into the heat storage tank 1. A configuration such as a pump for smoothly circulating the heat transfer fluid may be considered to be provided on the transfer pipe.

As previously described, a system to which the hybrid energy generating device 100 may be applied is not limited to a water heating system, and depending on how it is implemented, the hybrid energy generating device 100 may be applied and utilized in various systems such as an in-building heating system, and a heating, ventilation, & air conditioning system (HVAC).

According to an embodiment of the present disclosure, as shown in FIG. 1, the hybrid energy generating device 100 includes a plurality of heat storage pipes 101, 102, and 103, a photovoltaic (PV) panel 200, and a heat dissipation panel.

The first heat storage pipe 101 is a circular pipe member, and the inlet 1011 through which the heat transfer fluid flows is formed on one side thereof and is connected to the transfer tube. Meanwhile, the second heat storage pipe 102 is disposed in parallel with the first heat storage pipe 101 at a predetermined distance to face the first heat storage pipe 101, and has the outlet 1020 through which the heat transfer fluid is discharged is formed on one side thereof, and is connected to the heat storage tank 1 through the transfer tube.

When the inlet 1011 is formed on one side, it is preferable that the outlet 1020 be formed in a direction opposite to the inlet 101.

The third heat storage pipe 103 is a pipe member for interconnecting the first heat storage pipe 101 and the second heat storage pipe 102. That is, the third heat storage pipe 103 is disposed in the vertical direction in order to communicate the first heat storage pipe 101 and the second heat storage pipe 102 arranged in parallel in the horizontal direction at a predetermined interval.

According to the embodiment of the present disclosure shown in FIG. 1, a plurality of third heat storage pipes 103 are provided and arranged at regular intervals, however, the third heat storage pipe 103 is not necessarily installed in plurality and at regular intervals. It may also be considered that the interval between the third heat storage pipes 103 is narrowed as the distance from the inlet 1011 increases, or that the third heat storage pipe 103 is disposed on the side farther than the side close to the inlet 1011.

According to the embodiment of the present disclosure, the third heat storage pipe 103 is shown as a pipe member having the same diameter as the first heat storage pipe 101 or the second heat storage pipe 102. However, depending on how it is implemented, it may be considered that at least two or more third heat storage pipes 103 have different inner diameters, outer diameters, or diameters. Generally, the temperature of the heat transfer fluid on the inlet 1011 side is the lowest, and the farther from the inlet 1011 or closer to the outlet 1020 side, the higher the temperature of the heat transfer fluid will appear. Thus, when at least two or more third heat storage pipes 103 are provided, it may be considered to vary the amount of heat transfer fluid that can flow by varying the dimensions (inner diameter, diameter) of each third heat storage pipe 103, so that heat exchange may be performed evenly over all areas of the heat dissipation panel 300. As previously described, in the case of the embodiment in which the diameter of each third heat storage pipe 103 is different, it may also be considered to arrange each third heat storage pipe 103 at an optimal position or to vary the interval between the plurality of third heat storage pipes 103 taking into account factors such as the flow rate and transfer amount of the heat transfer fluid.

Meanwhile, the first heat storage pipe 101 has a first slit hole 101S formed on one side thereof in the longitudinal direction and the second heat storage pipe 102 has a second slit hole 102S formed on one side thereof in the longitudinal direction, and the first slit hole 101S and the second slit hole 102S are formed in a direction facing each other.

Figure 2:
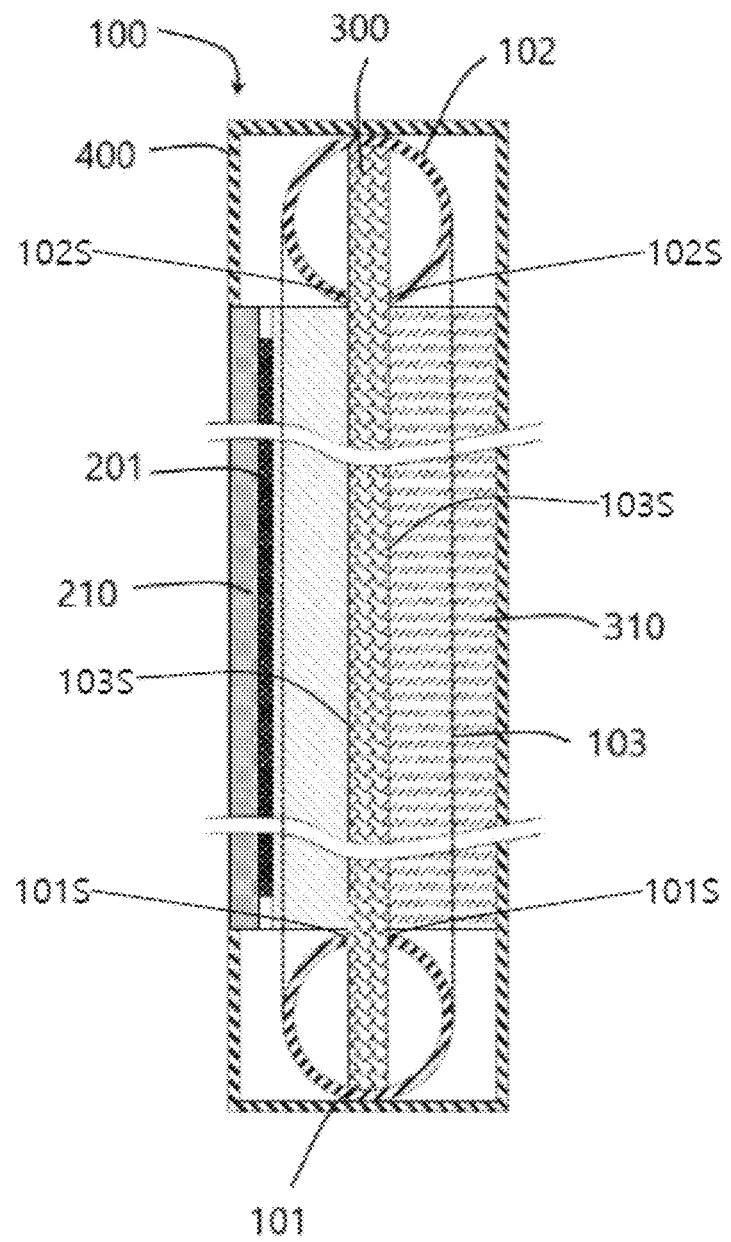
FIG. 2 is a cross-sectional view showing a cross-section of the hybrid energy generation device using sunlight and solar heat according to the embodiment of the present disclosure.

According to the embodiment of the present disclosure as shown in FIG. 1 or FIG. 2, the first slit hole 101S is formed on the upper surface of the first heat storage pipe 101 and the second slit hole 102S is formed on the lower surface of the second heat storage pipe 102, so that the upper and lower portions of the heat dissipation panel 300 are inserted into the slit holes 101S and 102S, respectively.

In addition, the third heat storage pipe 103 has a third slit hole 103S formed along the longitudinal direction, and the heat dissipation panel 300 penetrates to seal the third slit hole 103S and is inserted into the third heat storage pipe 103. As shown in FIG. 2, in the embodiment of the present disclosure, the third slit hole 103S is formed on each side of the third heat storage pipe 103 so that the heat dissipation panel 300 passes through the third heat storage pipe 103. However, when a plurality of heat dissipation panels 300 are provided, it may be considered that both ends of the heat dissipation panel 300 are inserted into and fixed to the third heat storage pipe 103 without necessarily passing through the third heat storage pipe 103.

According to the embodiment of the present disclosure, the first heat storage pipe 101, the second heat storage pipe 102, and the third heat storage pipe 103 are arranged to have a shape similar to '⊞'.

Figure 3:
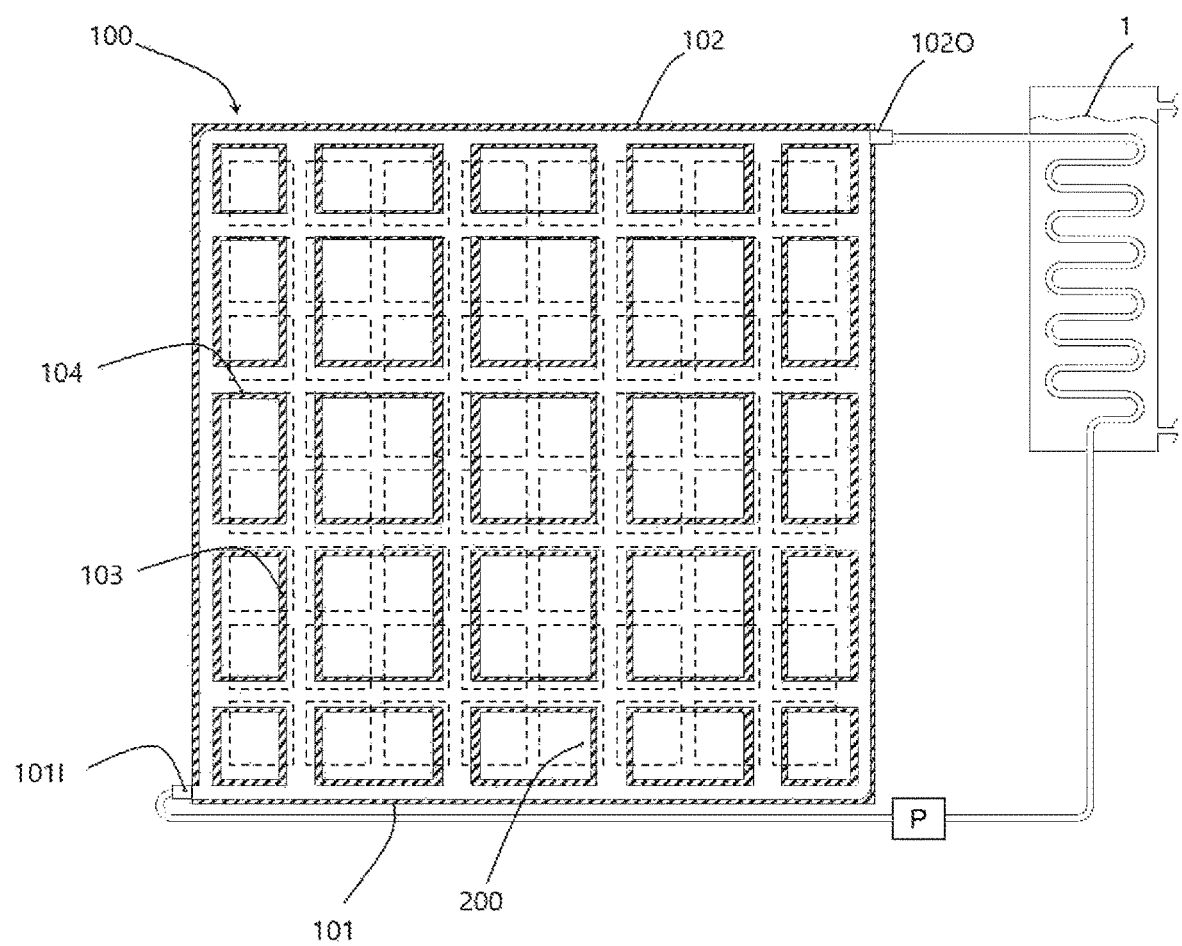
FIG. 3 is a view showing a hybrid energy generation device using sunlight and solar heat according to another embodiment of the present disclosure.
Figure 4:
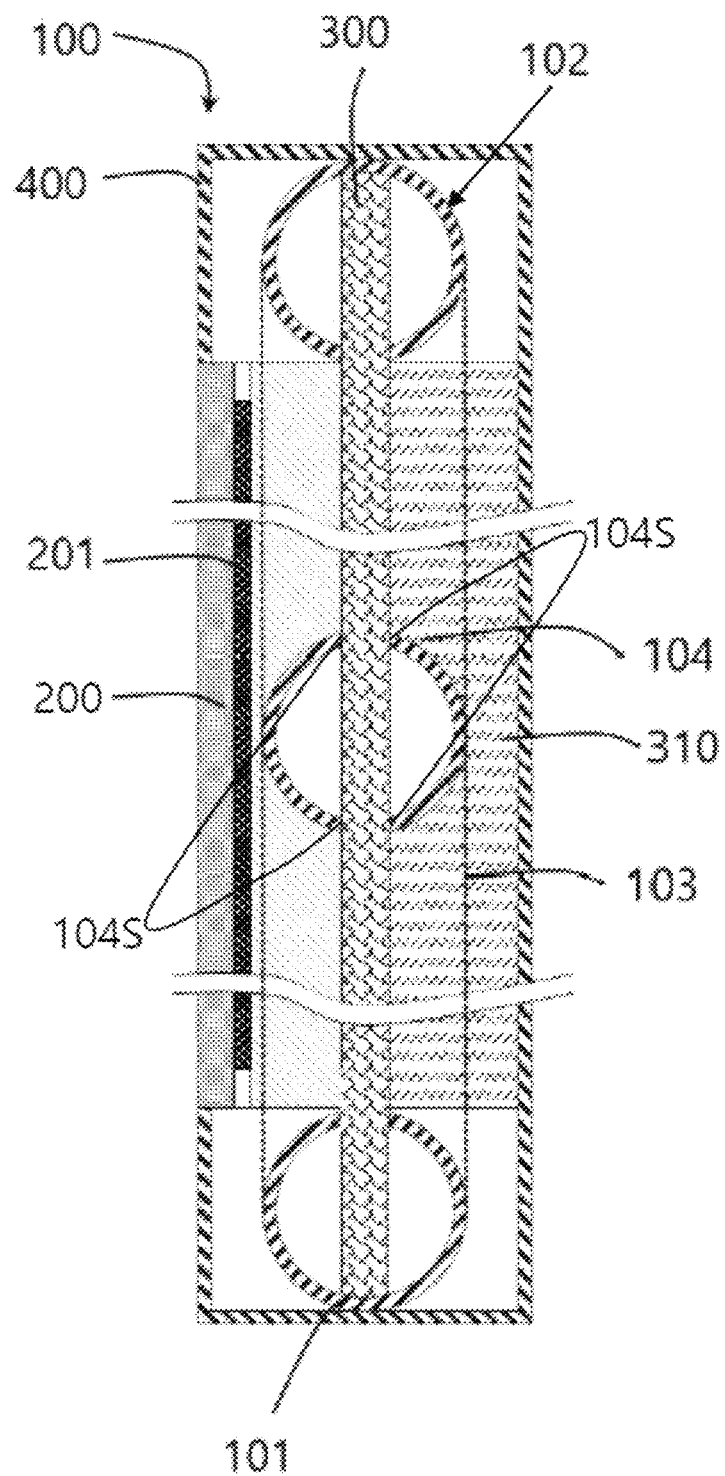
FIG. 4 is a cross-sectional view showing a cross-section of the hybrid energy generation device using sunlight and solar heat according to another embodiment of the present disclosure.

Furthermore, as with another embodiment of the present disclosure shown in FIGS. 3 and 4, a fourth heat storage pipe 104 connecting at least two or more third heat storage pipes 103 may be provided. In this embodiment, the third heat storage pipes 103 and the fourth heat storage pipes 104 are arranged in a grid like '⊞' vertically staggered from each other. However, although the third heat storage pipes 103 and the fourth heat storage pipes 104 may cross vertically as shown in FIG. 3, an arrangement that spreads toward the outlet 102O with respect to the inlet 1011 (radial) may also be considered.

According to the configuration of the heat storage pipes 101, 102, 103, and 104 as described above, heat exchange is performed by direct contact with the heat dissipation panel 300 while the heat transfer fluid circulates inside each heat storage pipe.

Although not shown in the drawing, it may be considered that an O-ring or an additional sealing means is further provided to improve the sealing force exerted between each slit hole 101S, 102S, 103S, and 104S and the surface of the heat dissipation panel 300.

The photovoltaic (PV) panel 200 is a panel provided with a plurality of PV cells 201 that generate electricity using sunlight, and more specifically, the plurality of PV cells 201 are provided on the front side of the PV panel 200 as show in FIG. 2. Meanwhile, a transparent protective glass 210 may be laminated on the front part of the PV panel 200. In addition, it may also be considered that a thin film layer for transmitting only a specific wavelength, an anti-reflection thin film, a heat insulating layer, etc. are provided on the front part of the PV panel 200. The plurality of PV cells 201 provided in the PV panel 200 are components that generate electricity using sunlight, and may be configured to supply electric energy generated to an external system or to store electric energy generated in a battery through a separate wiring or circuit board (not shown).

Portions of the upper and lower sides and a portion of the side of the heat dissipation panel 300 seal and penetrate the first slit hole 101S, the second slit hole 102S, and the third slit hole 103S, respectively, formed on the first heat storage pipe 101, the second heat storage pipe 102, and the third heat storage pipe 103, respectively, to be inserted in the first heat storage pipe 101, the second heat storage pipe 102, and the third heat storage pipe 103.

According to another embodiment of the present disclosure as shown in FIGS. 3 and 4, the outer portions of the heat dissipation panel penetrate and seal the first slit hole 101S, the second slit hole 102S, the third slit hole 103S, and the fourth slit hole 104S formed on the heat storage pipes 101, 102, 103, and 104, respectively, and are inserted in the heat storage pipes 101, 102, 103, and 104.

Meanwhile, as shown in FIGS. 2 and 4, cross-sections of upper and lower portions of the heat dissipation panel 300 inserted into the heat storage pipes 101 and 102 through the first slit hole 101S and the second slit hole 102S are formed in a curved shape so as to correspond to and to be in close contact with the inner surface of each heat storage tube 101, 102.

In addition, one side of the heat dissipation panel 300 is in direct contact with the back side of the PV panel 200. That is, the exposed portion of the heat dissipation panel 300 that is not inserted into any one of the heat storage pipes 101, 102, and 103 is in direct contact with the back side of the PV panel 200. As sunlight is radiated to the PV panel 200, the PV panel 200 gradually increases in temperature, so that the temperature of the PV panel 200 rises above the optimum operating temperature at which maximum power generation efficiency can be expected. However, since the heat dissipation panel 300 is in direct contact with the PV panel 200 to exchange heat, it is possible to suppress the temperature rise of the PV panel 200. In the meantime, the region of the heat dissipation panel 300 in which heat exchange is made directly with the PV panel 200 does not increase in temperature, but in the outer parts of the heat dissipation panel 300 inserted into heat storage pipes, heat exchange is made directly with the heat transfer fluid.

Preferably, between the heat dissipation panel 300 and the PV panel 200, a layer of thermal interface material (TIM) having good thermal conductivity such as thermal grease may be interposed. By interposing such a thermal interface material, heat exchange efficiency between the heat dissipation panel 300 and the PV panel 200 may be increased.

In addition, it is preferable that the other side of the heat dissipation panel 300 not in contact with the PV panel 200 is provided with a lagging material 310 to minimize heat loss.

Furthermore, the hybrid energy generating device 100 is provided in a frame 400 with the inside sealed to minimize heat loss due to unnecessary heat exchange with the external environment, and it is preferable that the inner space be vacuum-treated or filled with the lagging material 310 or the like.

As described above, the present disclosure has been described with specific matters such as specific components, limited embodiments, and drawings. However, these are only provided to aid a more general understanding of the present disclosure, and the present disclosure is not limited to the above embodiments, and various modifications and variations may be made from these descriptions by those skilled in the art to which the present disclosure pertains.

Therefore, the spirit of the present disclosure is not limited to the described embodiments, and not only the claims described below, but also all equivalents or equivalent modifications to these claims shall be within the scope of the spirit of the present disclosure.

What is claimed is:

1. A hybrid energy generation device using sunlight and solar heat, the device comprising:
    a photovoltaic (PV) panel in which a plurality of PV cells are arranged on a front side thereof;
    a first heat storage pipe having an inlet through which heat transfer fluid is introduced into the first heat storage pipe, and having a first slit hole formed on a side thereof in a first longitudinal direction;
    a second heat storage pipe disposed to face the first heat storage pipe, the second heat storage pipe having an outlet through which the heat transfer fluid is discharged from the second heat storage pipe, and having a second slit hole formed on a side thereof in a second longitudinal direction;
    at least two or more third heat storage pipes arranged to connect the first heat storage pipe and the second heat storage pipe to each other, and each having a third slit hole formed on a side thereof in a third longitudinal direction; and
    a heat dissipation panel laminated on a back side of the PV panel, wherein one side of the heat dissipation panel is in direct contact with the back side of the PV panel to directly exchange heat to each other to suppress a temperature rise of the PV panel,
    wherein a portion of a lower side and a portion of an upper side of the heat dissipation panel are inserted into the first heat storage pipe and the second heat storage pipe while sealing and penetrating the first slit hole and the second slit hole, respectively, and
    the heat dissipation panel is inserted into the at least two or more third heat storage pipes while sealing and penetrating the third slit hole corresponding to each third heat storage pipe
    wherein each of cross-sections of upper and lower end portions of the heat dissipation panel is formed in a curved shape so as to correspond to inner surfaces of the first and second heat storage pipes, wherein,
        the cross-section of the lower end portion of the heat dissipation panel directly contacts with the inner surface of the first heat storage pipe, and
        the cross-section of the upper end portion of the heat dissipation panel directly contacts with the inner surface of the second heat storage pipe.

2. The hybrid energy generation device using sunlight and solar heat of claim 1, the device further comprises:
    at least two or more fourth heat storage pipes arranged to connect the at least two or more third heat storage pipes to each other.

3. The hybrid energy generation device using sunlight and solar heat of claim 2, wherein a fourth slit hole is formed on a side of each fourth heat storage pipe in a fourth longitudinal direction, and
    the heat dissipation panel is inserted into the at least two or more fourth heat storage pipes while sealing and penetrating the fourth slit hole corresponding to each fourth heat storage pipe.

4. The hybrid energy generation device using sunlight and solar heat of claim 1, wherein a lagging material is provided on an exposed surface where the heat dissipation panel is not inserted.

* * * * *